No. 680,038. Patented Aug. 6, 1901.
K. GORE.
MOTOR.
(Application filed Oct. 29, 1900.)

(No Model.) 2 Sheets—Sheet 2.

WITNESSES: INVENTOR.
Jno. S. Robbins Kussuth Gore,
Arthur Hough BY
ATTORNEYS.

UNITED STATES PATENT OFFICE.

KOSSUTH GORE, OF BERKELEY, CALIFORNIA.

MOTOR.

SPECIFICATION forming part of Letters Patent No. 680,038, dated August 6, 1901.

Application filed October 29, 1900. Serial No. 34,814. (No model.)

*To all whom it may concern:*

Be it known that I, KOSSUTH GORE, a citizen of the United States, residing at 2801 Calais street, Berkeley, in the county of Alameda and State of California, have invented certain new and useful Improvements in Motors; and I do hereby declare the following to be a full, clear, and exact description of said invention, such as will enable others skilled in the art to which it most nearly appertains to make, use, and practice the same.

This invention relates to improvements in motors; and one object is to provide a motor particularly adapted for pumping and the like, the type here illustrated and described including a windmill automatically governed with relation to the force of the wind and the quantity of water desired in the storage-tank.

A further object is to provide a means whereby power may be stored up while the wind is blowing to be used when there is no wind.

The objects are accomplished by constructing the vanes of the mill so that they will be thrown out of operation by centrifugal force when the speed becomes too great, and to arrange a weight and a system of gears in such a manner that the power in excess to that necessary to run the pump will raise the weight to operative position.

Although the present motor is herein shown and described in connection with a windmill, it will be readily understood that said motor can be employed for other purposes.

Figure 1:
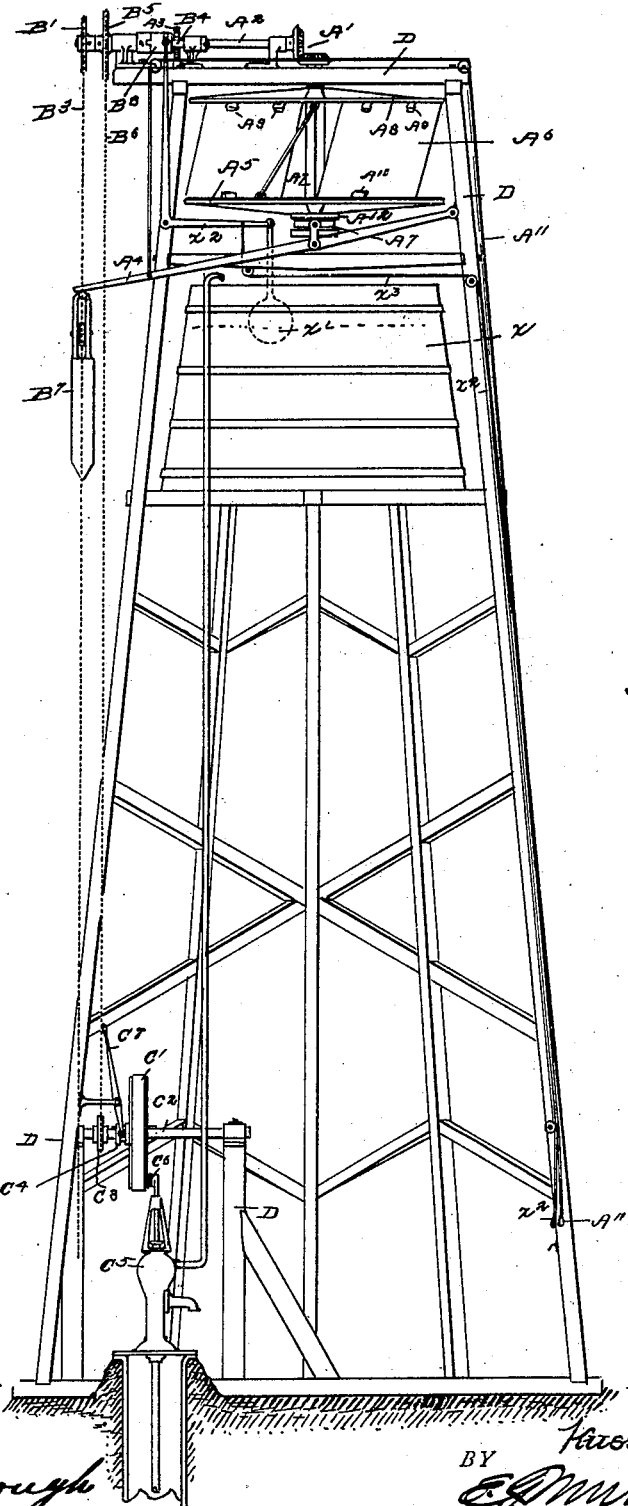
Figure 2:
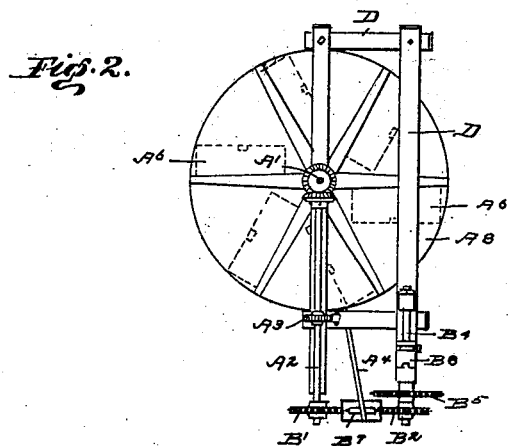
Figure 3:
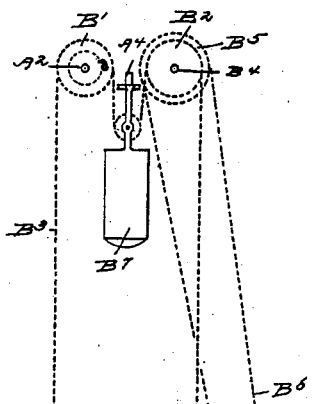

In the drawings, Figure 1 is a side elevation of a motor and windmill constructed in accordance with this invention. Fig. 2 is a plan view from above of the weight mechanism and the top of the windmill. Fig. 3 is a diagrammatic side elevation of the weight mechanism.

In the description with reference to the drawings distinguishing letters of reference will be used to designate the principal groups of mechanisms, and to these common letters a numeral will be added to designate the minor parts of each group.

The wheel of the windmill or the primary motor will be designated by the letter A, the weight mechanism by the letter B, the pumping mechanism by the letter C, and the framework supporting the various mechanisms by the letter D.

Presuming the wind to be calm, the tank empty, and the weight down, a wind coming up would start the wheel A revolving, the rotation being transmitted through the bevel-gears A' shaft $A^2$ to the sprocket B', actuating the sprocket $B^2$ through the elongated endless chain or belt $B^3$, in the upper bight of which the weight $B^7$ is suspended. Fixed on the shaft $B^4$ of the sprocket $B^2$ is the sprocket-wheel $B^5$, which transmits the power through the chain belt $B^6$ to the cam-wheel C' of the pumping mechanism. When the water in the tank X rises to the desired height, the float X', acting through the bell-crank lever $X^2$, pivoted to the framework D, throws the clutch $B^8$ on the shaft $B^4$ into engagement, which locks the shaft $B^4$. The shaft $B^4$ being locked, the continued rotation of the sprocket B' winds up the endless chain $B^3$, slowly raising the weight $B^7$. The sprocket B' is prevented from rotating backward by reason of the weight $B^7$ by the ratchet mechanism $A^3$ on the shaft $A^2$. When the weight $B^7$ rises into contact with the shut-off lever $A^4$, the same slowly rises with the weight, raising the platform $A^5$ until the vanes $A^6$ present no resistance to the wind and the mill is stopped.

The shut-off mechanism consists of the lever $A^4$, pivoted at one end, engaging the wheel of the windmill through collar $A^{12}$ and yoke $A^7$ on the lever $A^4$. The shut-off may be operated independent of the automatic arrangement by the cord $A^{11}$, attached to the lever $A^4$.

The pumping mechanism consists of the shaft $C^2$, suitably journaled in the framework D. Mounted on the shaft $C^2$ is the actuating-sprocket $C^3$, the cam-wheel C' having the clutch $C^4$ thereon, the pitman-rod of the pump $C^5$ engaging the cam C' by the antifriction-wheel $C^6$ on the head of the pitman extending into the slot in the cam-wheel C'. The cam-wheel is thrown into and out of engagement with the pump $C^5$ by the clutch $C^4$, actuated by the lever $C^7$. The periphery of the cam-wheel C' may be belted to any suitable small machinery when not operating the pump.

When the tank is full, the weight up, and there is no wind and power wanted, the clutch B⁸ is released by tying down the cord X³, which submerges the float X, permitting the weight B⁷ to descend, actuating the shaft C², as before described.

In the above-described mechanism the chain, the two pulleys, and the weight constitute a secondary motor, of which the said weight when raised becomes the power member.

No claim is herein made to the construction of the wind-wheel herein shown and described, as said wind-wheel forms the subject-matter of a separate application to be filed by me. Said wheel is constructed as follows: Rigidly mounted on the central vertical shaft A⁷ is the circular horizontal platform A⁸. Suspended radially therefrom on hinges A⁹ are the vanes A⁶, having the antifriction-roller A¹⁰ mounted therein where they come in contact with the platform A⁵, similar to platform A⁸, except that platform A⁵ is capable of a vertical action on the central shaft A⁷, while not being independent of the rotation of the said shaft. Secured to the under side of the platform A⁵ is the collar A¹², engaging the yoke A⁷ on the lever A⁴, as above described, acting as a shut-off. When the rotation of the wheel A becomes too rapid, the centrifugal force generated lifts the vanes A⁶ independent of the platform A⁵, acting as an automatic speed-governor.

The combination of elements above described constitutes a windmill requiring very little attention and is particularly adapted to work in isolated places or where it is inconvenient to give it the attention necessary to the ordinary windmill. Further, where the wind is fitful the weight stores sufficient power usually to maintain a water-supply.

Having thus described this invention, what is claimed is—

1. In a device of the nature indicated, a primary motor, a storage-motor, connection between both of said motors and the machine to be driven, means whereby said primary motor can operate to drive said machine but not operate said storage-motor, means whereby said primary motor can be caused to operate said storage-motor to store energy therein, and means under control of the said driven machine for automatically throwing said primary motor out of operative connection with said driven machine and into operative connection with said storage-motor to store energy therein; substantially as described.

2. In a stationary device of the nature indicated, a primary motor, a secondary motor, connection between both of said motors and the machine to be driven, means for holding said secondary motor out of operative connection with the said driven machine, and means under the control of said driven machine for automatically throwing said secondary motor into operative connection with said driven machine; substantially as described.

3. In a stationary device of the nature indicated, a primary motor, a storage-motor, connection between both of said motors and the machine to be driven, means for holding said storage-motor out of operative connection with said driven machine, means for causing said primary motor to operate said storage-motor to store energy therein, and means under the control of the said driven machine for automatically throwing said storage-motor into operative connection with said driven machine; substantially as described.

4. In a device of the nature indicated, a primary motor, a storage-motor, connection between both of said motors and the machine to be driven, means for causing said primary motor to operate said storage-motor to store energy therein; and means under the control of the said driven machine for automatically throwing said primary motor out of operative connection with the said driven machine and for automatically throwing said storage-motor into operative connection with said driven machine; substantially as described.

5. In a device of the nature indicated, a primary motor, a storage-motor, connection between both of said motors and the machine to be driven, means whereby said primary motor can operate to drive said machine but not operate said storage-motor, means whereby said primary motor can be caused to operate said storage-motor to store energy therein, and means under control of the said driven machine for automatically throwing said primary motor out of operative connection with said driven machine and into operative connection with said storage-motor to store energy therein and for automatically throwing said storage-motor into operative connection with said driven machine; substantially as described.

6. In a device of the nature indicated, a primary motor having connection with the machine to be driven, a weighted chain in connection with said primary motor and adapted to be raised thereby, positive means whereby said primary motor normally operates without raising said weighted chain, positive means for causing the surplus energy generated by said primary motor to raise said weighted chain, and driving connection between said chain and said driven machine whereby said weighted chain can become a storage-motor for driving said machine; substantially as described.

7. In a device of the nature indicated, a primary motor, a pulley driven thereby, a second pulley, an elongated endless driving-belt connecting said pulleys and so supported that a bight is produced intermediate said pulleys, a weight suspended in said bight of said belt, driving connection between said pulleys and the driven machine, and means for temporarily locking said second pulley against movement, said belt being held against movement thereon, whereby said first pulley raises the weight-carrying portion of the belt and converts said weight into the power member of a secondary motor; substantially as described.

8. In a device of the nature indicated, a primary motor, a pulley driven thereby, a second pulley, an elongated endless driving-belt connecting said pulleys and so supported that a bight is produced intermediate said pulleys, a weight suspended in said bight of said belt, driving connection between said pulleys and the driven machine, and means automatically controlled by said driven machine for temporarily locking said second pulley against movement, said belt being held against movement thereon, whereby said first pulley raises the weight-carrying portion of the belt and converts said weight into the power member of a secondary motor; substantially as described.

9. In a device of the nature indicated, a primary motor, a pulley driven thereby, a second pulley, an elongated endless driving-belt connecting said pulleys and so supported that a bight is produced intermediate said pulleys, a weight suspended in said bight of said belt, driving connection between said pulleys and the driven machine, and a clutch adapted to engage said second pulley and lock the same against movement, said belt being held against movement on said pulley, whereby said first pulley raises the weight-carrying portion of the belt and converts said weight into the power member of a secondary motor; substantially as described.

10. In a device of the nature indicated, a primary motor, a pulley driven thereby, a second pulley, an elongated endless driving-belt connecting said pulleys and so supported that a bight is produced intermediate said pulleys, a weight suspended in said bight of said belt, driving connection between said pulleys and the driven machine, a tank receiving a fluid from the action of said driven machine, a float in said tank, and means carried by said float for temporarily locking said second pulley against movement, said belt being held against movement thereon, whereby said first pulley raises the weight-carrying portion of the belt and converts said weight into the power member of a secondary motor; substantially as described.

11. In a device of the nature indicated, a primary motor, a pulley driven thereby, a second pulley, an elongated endless driving-belt connecting said pulleys and so supported that a bight is produced intermediate said pulleys, a weight suspended in said bight of said belt, driving connection between said pulleys and the driven machine, a tank receiving a fluid from the action of said driven machine, a float in said tank, a clutch member mounted upon the shaft of said second pulley, and a lever connected to said clutch and said float, whereby as said float is raised said clutch is thrown for temporarily locking said second pulley against movement, said belt being held against movement thereon, whereby said first pulley raises the weight-carrying portion of the belt and converts said weight into the power member of a secondary motor; substantially as described.

12. In a device of the nature indicated, the combination with a wheel adapted to be rotated by suitable power, a primary shaft adapted to turn in one direction only and geared to said wheel, a secondary shaft, sprocket-wheels mounted in line on said primary and secondary shaft, an endless chain engaging said sprocket-wheels, a weight member suspended in the bight of the endless chain in such a manner that the secondary shaft is actuated by the weight of the weight member, gearing from the secondary shaft to operate a pulley having a surface cam adapted to reciprocate the pitman-rod of a force-pump, means for throwing the cam and pump into and out of engagement, means for automatically stopping and starting the secondary shaft with relation to the water-supply, and means for automatically stopping and starting the said wheel with relation to the weight member; substantially as described.

In testimony whereof I have hereunto set my hand this 16th day of October, 1900.

KOSSUTH GORE.

Witnesses:
BALDWIN VALE,
H. A. JOHNSON.